US012762531B2

(12) United States Patent
Putham Das et al.

(10) Patent No.: US 12,762,531 B2
(45) Date of Patent: Oct. 13, 2026

(54) MICROPAYMENTS TRANSACTION SYSTEM

(71) Applicant: MASTERCARD ASIA/PACIFIC PTE. LTD., Singapore (SG)

(72) Inventors: Rahul Das Putham Das, Alexandria, VA (US); Mayank Prakash, Singapore (SG); Nimit Gulati, Singapore (SG); Sandeep Gelli, Singapore (SG)

(73) Assignee: Mastercard International Incorporated, Purchase, NY (US)

( * ) Notice: Subject to any disclaimer, the term of this patent is extended or adjusted under 35 U.S.C. 154(b) by 5 days.

(21) Appl. No.: 18/596,567

(22) Filed: Mar. 5, 2024

(65) Prior Publication Data

US 2025/0285098 A1 Sep. 11, 2025

(51) Int. Cl.
*A63F 13/792* (2014.01)
*G06Q 20/22* (2012.01)

(52) U.S. Cl.
CPC ........... *G06Q 20/29* (2013.01); *A63F 13/792* (2014.09)

(58) Field of Classification Search
CPC .............................. G06Q 20/29; A63F 13/792
USPC ............................................................ 705/39
See application file for complete search history.

(56) References Cited

U.S. PATENT DOCUMENTS 10,200,394 B2 2/2019 Grigoryan et al.
10,380,703 B2 8/2019 Chrapko et al.
11,132,686 B2 9/2021 Nightengale et al.
11,164,420 B2 * 11/2021 Shepherd ............ G07F 17/3227
2002/0111907 A1 * 8/2002 Ling ...................... G06Q 20/28 705/41
2002/0116331 A1 * 8/2002 Cataline ................. G06Q 20/10 705/40
2005/0075939 A1 * 4/2005 Bao .................... G06Q 30/0635 705/16
2008/0021829 A1 * 1/2008 Kranzley ............... G06Q 40/02 705/44
2012/0323717 A1 12/2012 Kirsch
2022/0366421 A1 11/2022 Wang et al.

OTHER PUBLICATIONS

PCT/US2025/034984 International Search Report and Written Opinion dated Oct. 30, 2025, pp. 1-11.

* cited by examiner

*Primary Examiner* — Clifford B Madamba
(74) *Attorney, Agent, or Firm* — Pramudji Law Group PLLC; Ari Pramudji

(57) ABSTRACT

An improved payment system is provided for approving micropayments during interactive services engaged by consumers. The payment system provides a stored list of multiple sources of payment entered by the consumer. A transaction processor receives micropayment transaction payment requests and uses a financial database to approve or deny the request before submitting the payment request to the corresponding cash account or credit account issuer. The improved payment system may be useful in reducing latency due to waiting for payment approvals and may be useful in reducing transaction costs.

20 Claims, 6 Drawing Sheets

MICROPAYMENTS TRANSACTION SYSTEM

BACKGROUND

The present inventions relate generally to financial transaction processing, and more particularly, to processing micropayment transactions.

Modern consumer payment systems commonly utilize sophisticated transaction systems involving one bank associated with the consumer, another bank associated with the merchant and a transaction processor that facilitates payments from the consumer bank to the merchant bank. While these systems are widely used, well-known and quite efficient, conventional transaction systems have costs associated with such systems that can be attributed to each individual transaction. In addition, each transaction through such a system takes a certain amount of time to be completed. In most situations, the individual transaction costs and processing time are minimal and do not cause any significant impediments to using such a system for ordinary purchases between consumers and merchants.

However, in some situations, transaction costs and processing time can become a concern for conventional modern consumer payment systems. One such situation involves micropayments between a consumer and a merchant. Although various monetary values can be used to define a micropayment, payments between a consumer and a merchant involving more than $10 are usually considered to be conventional payments and are not considered to be micropayments. That is, when the purchase price of a good or a service being sold to a consumer by a merchant is more than $10, the transaction costs associated with the transaction are minimal relative to the purchase price of the good or service, and therefore, the transaction costs raise few concerns for such purchases. On the other hand, when the purchase price is smaller (i.e., less than at least $10), the individualized cost of the transaction relative to the purchase price itself can be noticeably higher. This may limit the adoption of conventional modern consumer payment systems for such transactions.

Additionally, the amount of time that it takes to complete an individual transaction can be an impediment in some cases. Although conventional modern consumer payment systems are relatively fast in completing transactions, in some situations the consumer may have a greater need for transactions to be completed in real-time (i.e., nearly instantaneously). One example of this is computer gaming where the game allows purchases to be made while playing the game and where the purchase affects how the game is played. Not only is the speed of transaction processing critical for computer gaming with in-game purchases, but the value of such purchases is usually in the range of a micropayment. Thus, these types of transactions can be challenging for conventional modern consumer payment systems to complete efficiently and satisfactorily.

SUMMARY

An improved payment system is described. The improved system may be particularly useful for decreasing the amount of time needed to approve payment requests for micropayments authorized by consumers during interactive services. Transaction costs may also be reduced. The consumer enters multiple sources of payment in a stored list. The sources of payment may include cash accounts or credit accounts. When the consumer authorizes a transaction, a payment request is received by a transaction processor. The transaction processor reviews the payment request by accessing a financial database and approves or denies the payment request before the request is submitted to the consumer's bank for final approval. The financial database may include past financial transactions, past cash account balances or past credit account balances. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1A:
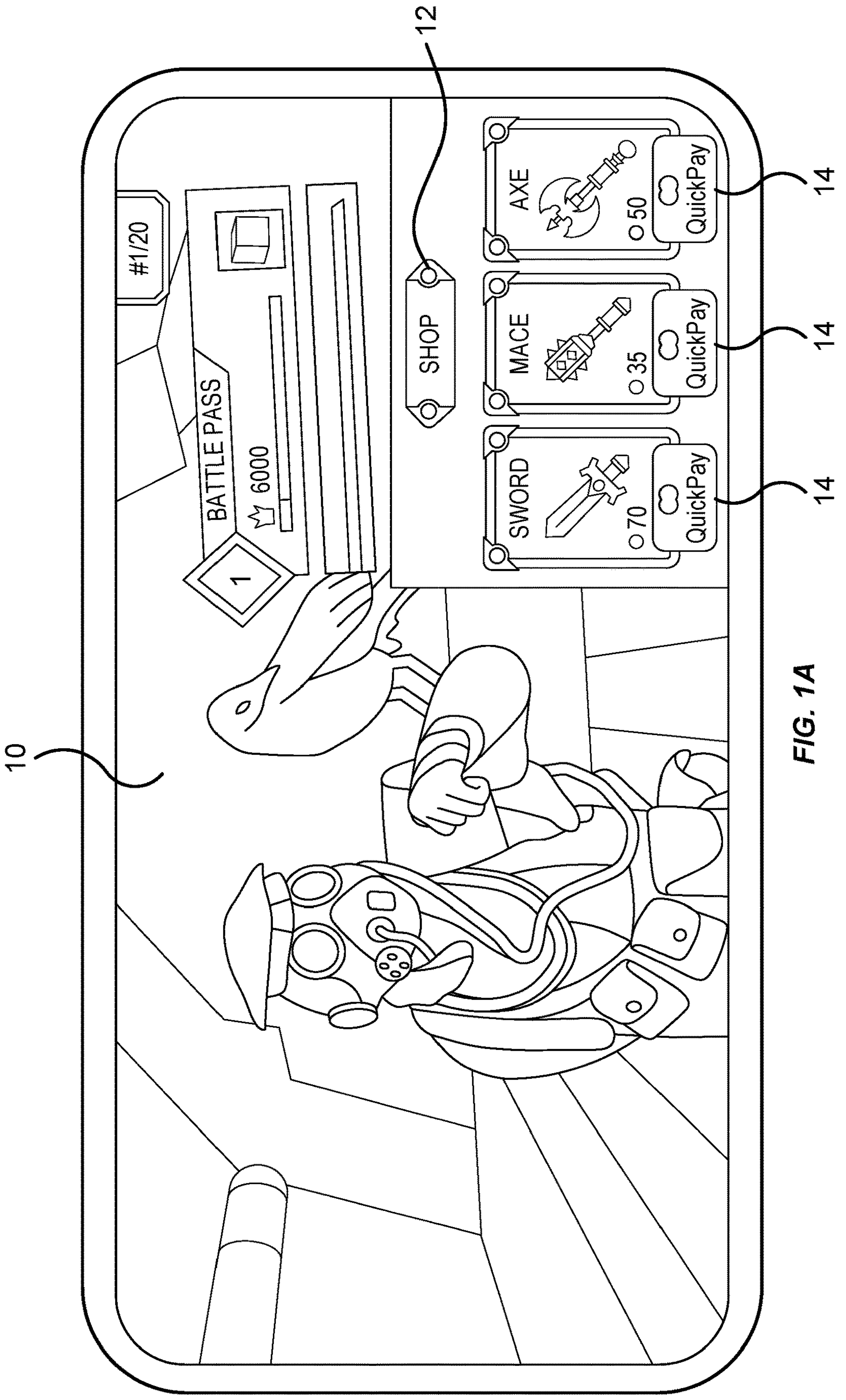
FIG. 1A illustrates a game with in-game purchases.
Figure 1B:
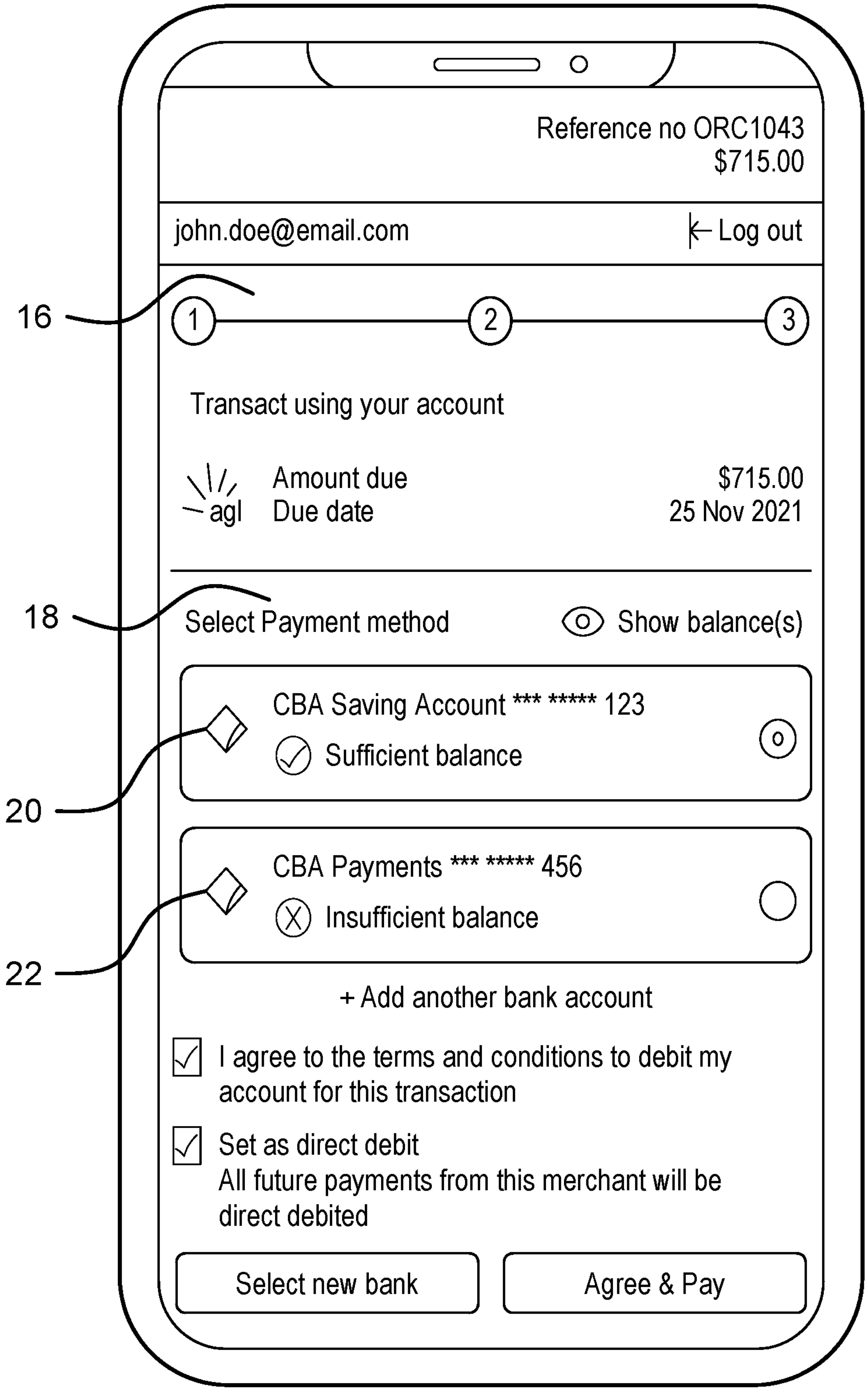
FIG. 1B illustrates a payment screen with multiple sources of payment.
Figure 1C:
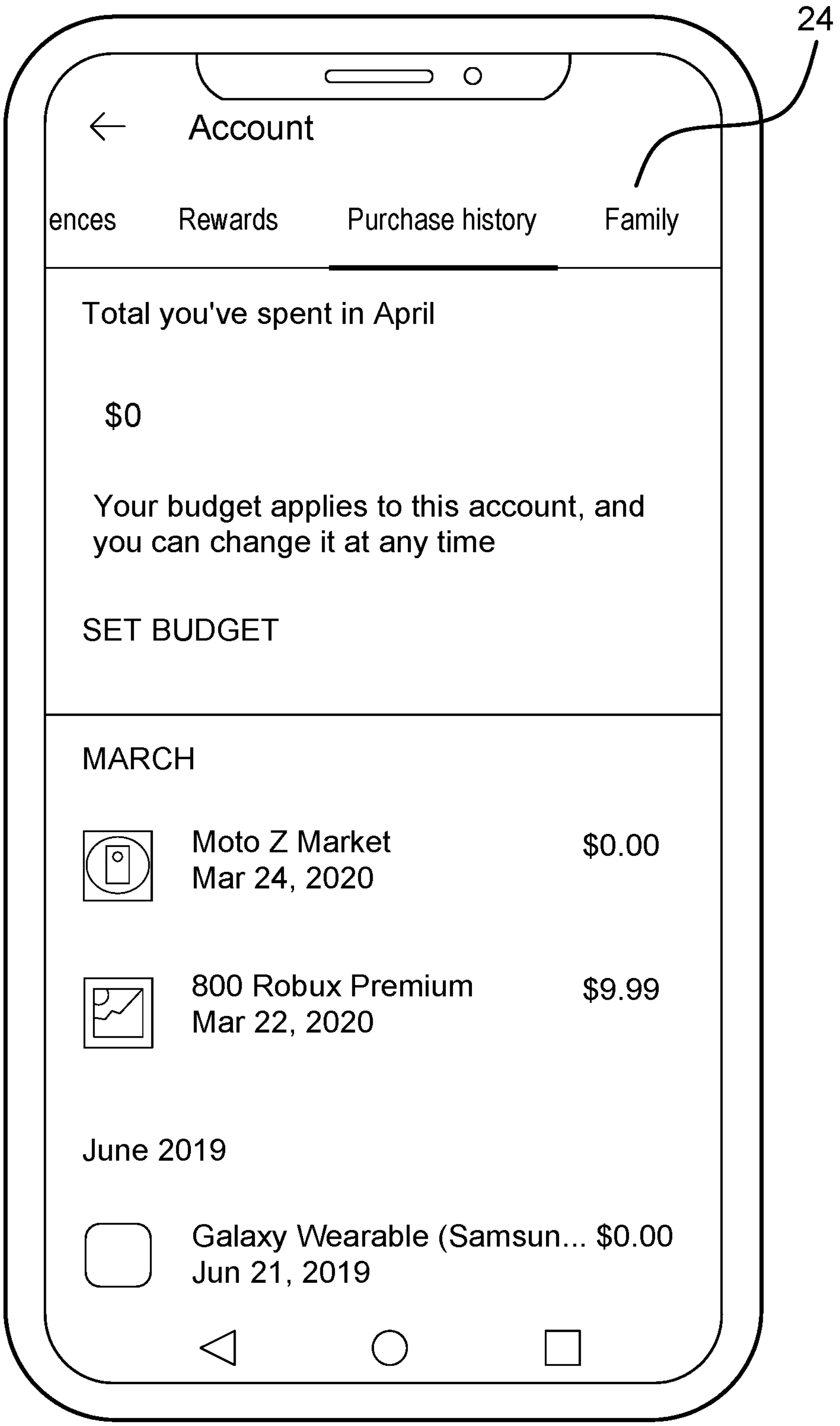
FIG. 1C illustrates a purchase history screen.

Referring now to the figures, and particularly FIG. 1A, an electronic game screen 10 is shown. As shown, the electronic game 10 allows purchases 12 to be made while play continues or while the game 10 is temporarily paused (i.e., during a game session). Typically, such games 10 allow different game items 14 to be purchased at various prices. Typically, in-game purchases 12 (i.e., micropayment transactions) may be used to upgrade electronic tools 14 in the game 10 or for other upgrades or may be used to enable continued playing of the game 10. In order to facilitate in-game purchases 12, a payment screen 16 like FIG. 1B may be provided that the consumer 26 may access and set up for completing such in-game purchases 12. As shown, the payment screen 16 may include a stored list 18 of multiple sources of payment 20, 22 associated with the consumer 26 for paying for in-game purchases 12. Although numerous types of payment sources 20, 22 may be included in the payment method list 18, it is preferred for the list 18 to include sources of payment 20, 22 that correspond to both cash accounts 20 and credit account issuers 22, and more preferably, at least one of the payment sources 20, 22 may be associated with a corresponding credit account issuer 22. Examples of a cash account 20 include a debit card or a savings account in which the consumer has deposited cash that may be used to pay for purchases using cash payment services like ACH transfers. By contrast, an example of a credit account 22 includes a credit card provided to the consumer 26 by an issuer 32 (also referred to as the consumer's bank 32). In this case, the issuer 32 approves consumer purchases using credit which the consumer 26 agrees to pay back at a later time. As shown in FIG. 1C, it may also be desirable to provide the consumer 26 with a purchase history screen 24 to show how much the consumer 26 has spent using the list 18 of payment sources 20, 22. Although it is understood that electronic games 10 like FIG. 1A are one type of interactive service 10 that may allow consumers 26 to make micropayment transactions while the consumer 26 is interactively engaged with the interactive service 10, there are many other interactive services 10 besides electronic games 10 that may allow micropayment transactions while being engaged with the service.

In a conventional modern consumer payment system, a consumer 26 initiates a request to pay a merchant 28 for a service or good by providing the merchant 28 with information about an account 20, 22 assigned to the consumer 26, such as a credit card or debit card number 20, 22. Typically, the merchant 28 then forwards the payment request to an intermediary like the merchant's bank 34 (e.g., an acquirer 34) or a payment processor 30 who handles payment requests from numerous merchants 28. The payment request is then forwarded to the consumer's bank 32 who manages the consumer's account 20, 22 from which the payment will be made. After reviewing the payment request and various details associated therewith (e.g., account status, identity information, amount of payment request, etc.), the consumer's bank 32 approves or denies the payment request and sends the payment decision back to the intermediary 30, 34 for forwarding to the merchant 28. However, as noted above, conventional payment systems of this type may be inadequate for micropayments, and especially where the micropayment is being made during engagement with an interactive service 10.

Figure 2:
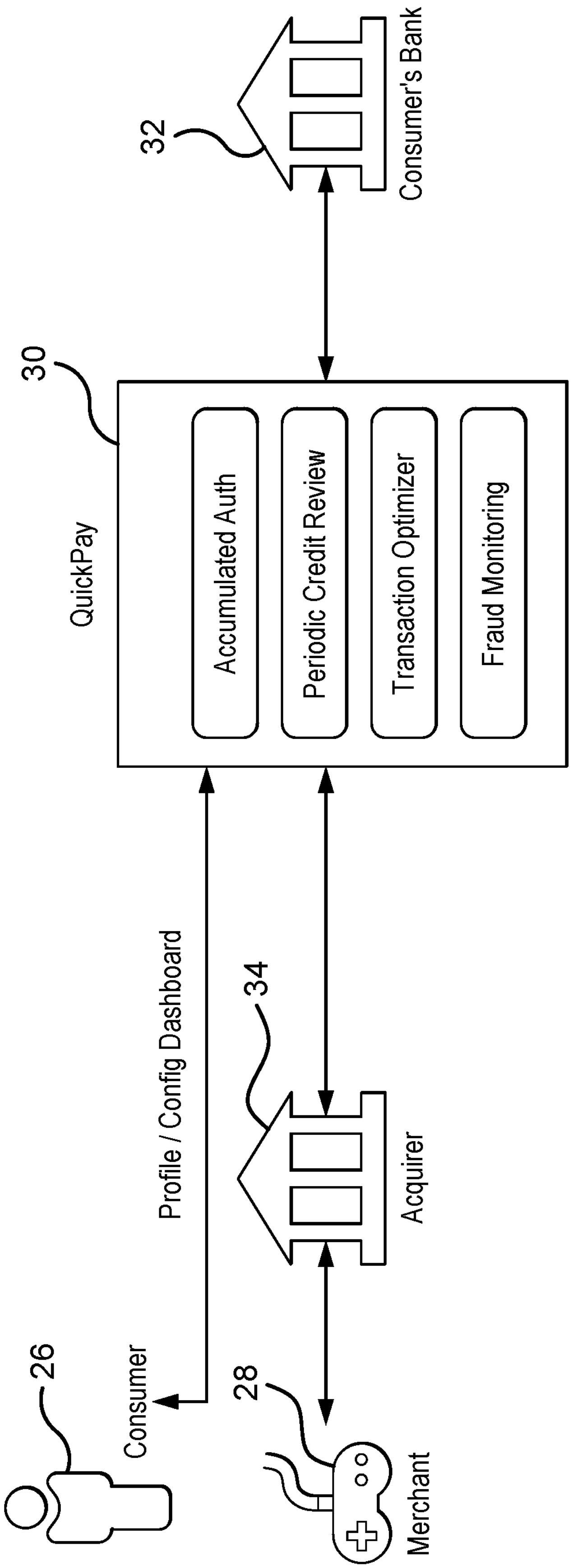
FIG. 2 illustrates one embodiment of a micropayment transaction system.
Figure 3:
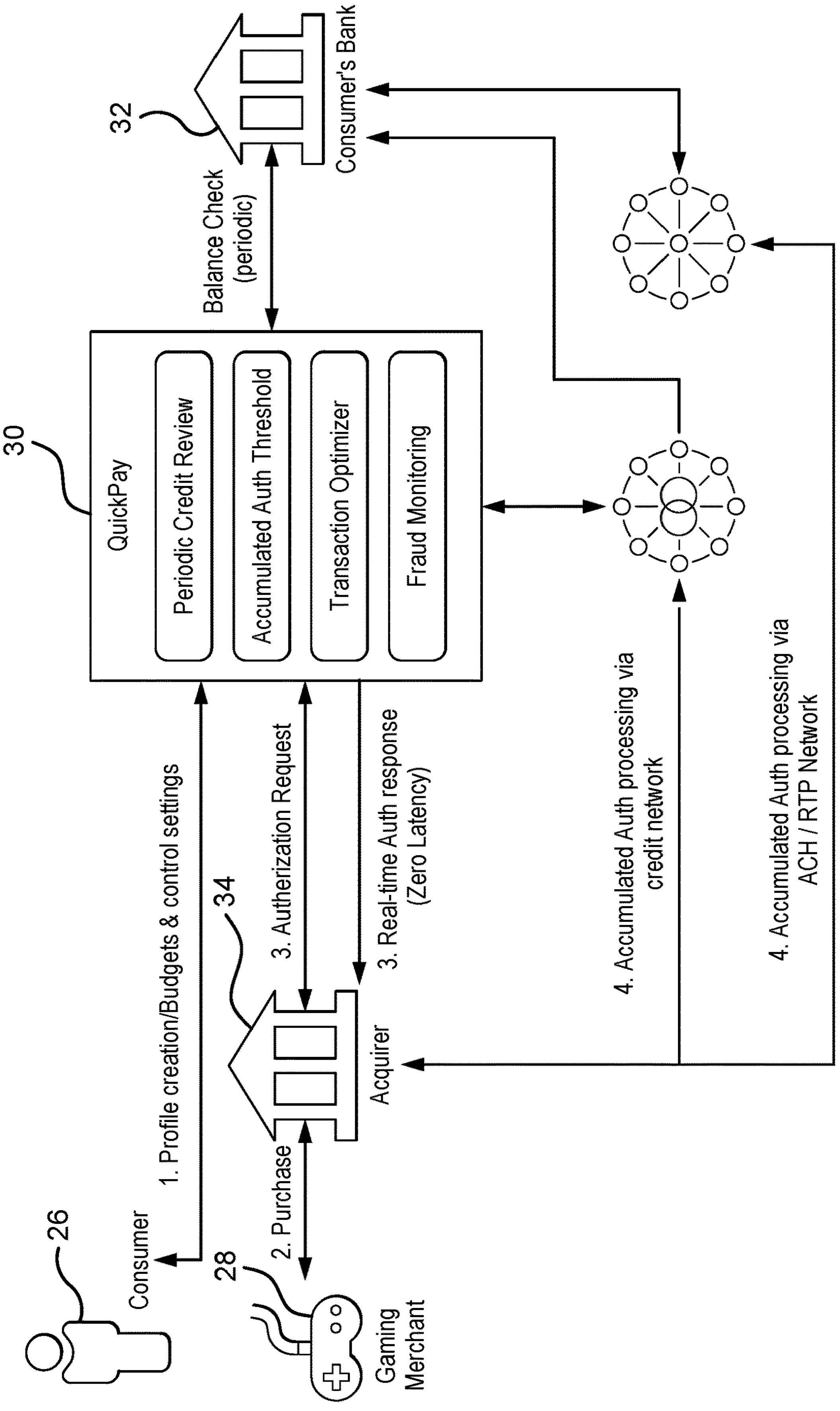
FIG. 3 illustrates another embodiment of a micropayment transaction system.
Figure 4:
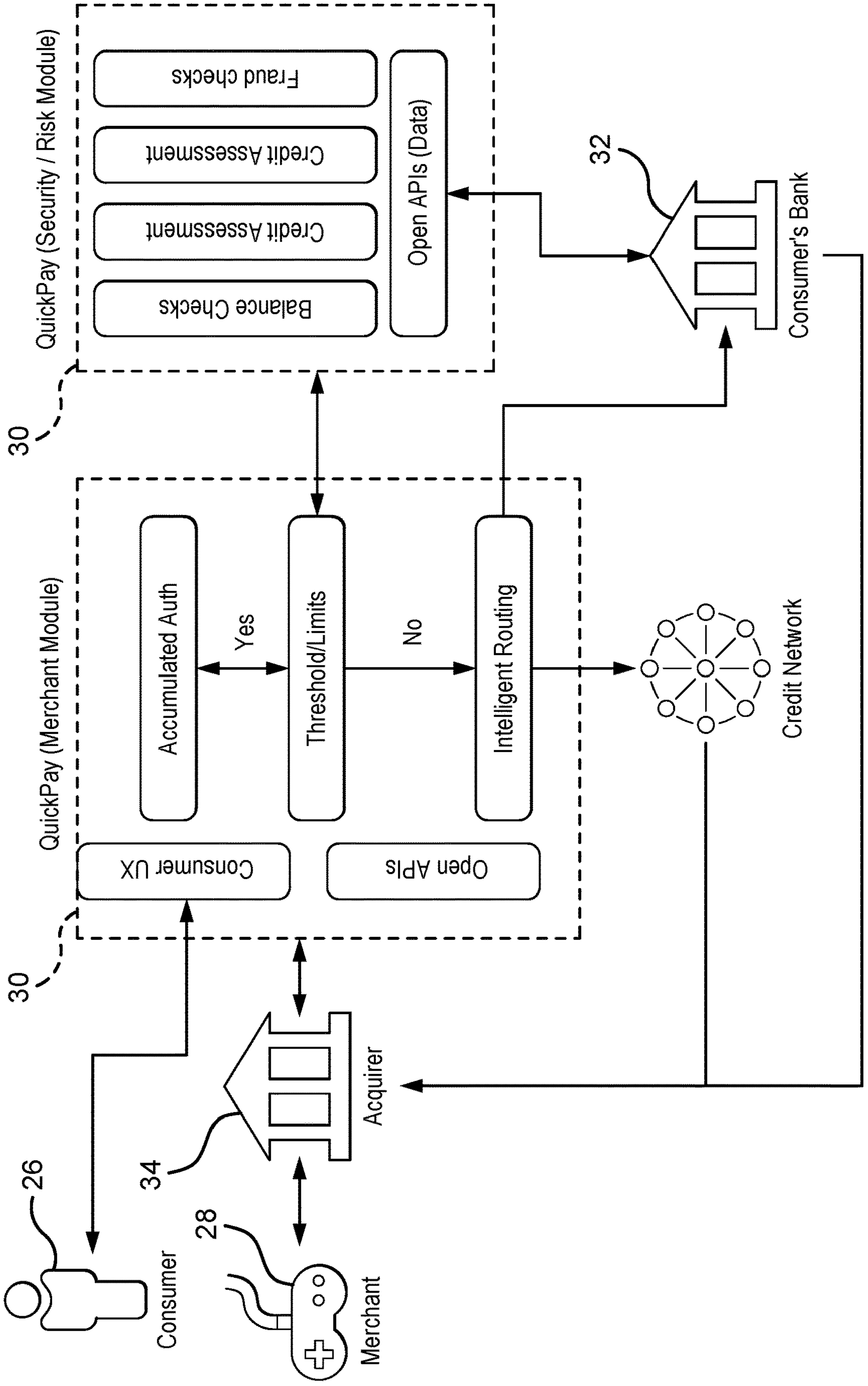
FIG. 4 illustrates another embodiment of a micropayment transaction system.

Thus, turning to FIGS. 2-4, embodiments of an improved system of processing micropayment transactions is provided. In this system, when a consumer 26 initiates a micropayment transaction payment request as described above in connection with FIGS. 1A-1C, the payment request is forwarded by the merchant 28 to a transaction processor 30. As shown, the payment request will typically be forwarded to an acquirer 34 who then forwards the request to the transaction processor 30. As noted above, the payment request requests payment from one of the multiple sources of payment 20, 22 in the stored list 18 of payment sources 20, 22. The transaction processor 30 then reviews a financial history associated with the consumer 26 which is stored in a financial database and which may include past financial transactions, past cash account balances, past credit account balances and/or other relevant financial information. Unlike conventional payment systems, the transaction processor 30 then approves (or denies) the payment request before submitting the payment request to the consumer's bank 32 (i.e., the cash account 20 or credit account issuer 22) for approval. One reason that conventional payment systems do not operate in this way is that the transaction processor 30 assumes a financial risk in this scenario because when the transaction processor 30 forwards the payment request to the consumer's bank 32 after the transaction processor 30 has already sent an approval to the merchant 28 it is possible that the consumer's bank 32 will deny the payment request. This means that the transaction processor 30 could be required to make the payment directly itself and accept a financial loss from the transaction.

Despite this financial risk for the transaction processor 30, the improved payment system can significantly speed up approvals for payment requests since one of the most time-consuming steps in conventional payment systems is forwarding the payment request to the consumer's bank 32 for approval. This is particularly the case where the source of payment corresponds to a credit account issuer 22, 32. One reason for this is that credit account issuers 22, 32 provide credit services to consumers 26 and assume certain financial risks themselves of nonpayment by the consumer 26. Thus, credit account issuers 22, 32 typically require a variety of financial checks before approving payment requests which can significantly increase the time it takes to provide a payment request approval to the merchant 28.

The improved payment system may be especially useful where the consumer 26 is engaging an interactive service 10 like an electronic game 10 during a session of the service 10. In this case, the session is typically stalled while the interactive service 10 waits for the transaction to be completed and depends on the merchant 28 or the acquirer 34 receiving approval of the transaction. Thus, the system is especially useful where the transaction and approval are occurring during a session of an interactive service 10. The improved service may also be more useful where the transactions are micropayment transactions (e.g., less than $10 or $5) since these are more likely to be the types of transactions to occur during a session with an interactive service 10. By utilizing this payment system for only micropayment transactions, the financial risk assumed by the transaction processor 30 is also minimized.

The improved payment system also offers the ability to easily switch between different payment sources 20, 22, potentially by both the consumer 26 and the transaction processor 30, in order to accommodate various desires. For example, it may be desirable for the consumer 26 to be provided with the ability to sort the multiple sources of payment 20, 22 in order of preference. In this case, the transaction processor 30 selects one of the multiple sources of payment 20, 22 based on the order of preference set by the consumer 26. However, it is preferred for the transaction processor 30 to be allowed to incorporate other factors as well into the selection process of which payment source 20, 22 to use for a particular transaction. Thus, while the consumer 26 may select the order of preference, the transaction processor 30 may autonomously select which payment source 20, 22 is actually used for approving a transaction, and this may involve the transaction processor 30 selecting a payment source 20, 22 that is lower on the list 18 based on various considerations. For example, it may be desirable for the transaction processor 30 to select payment sources 20, 22 corresponding to a cash account 20 first before selecting a payment source corresponding to a credit account 22 since the transaction processor 30 may assume more financial risk when approving a payment from a credit account 22. In this scenario, the transaction processor 30 may be able to quickly check the cash balance of cash accounts 20 in the payment list 18 to determine which cash accounts 20 have a positive balance. This would allow the transaction processor 30 to select one of the cash accounts 20 from the list 18 with a positive balance before selecting a credit account 22 in order to reduce the financial risk for the transaction processor 30. Preferably, the transaction processor 30 verifies the account balance of a cash account 20 selected for payment before the transaction payment request is approved. In most cases, this will not slow down the approval process significantly because cash balance checks can be done quite quickly compared to other types of account checks. It may also be desirable for the list 18 of payment sources 20, 22 to include a default payment source that is associated with a corresponding cash account 20 so that payments are made from the default cash account 20 before selecting a different cash account 20 or a credit account 22. Further, it may be desirable for the transaction processor 30 to only select one of the credit accounts 22 when none of the cash accounts 20 in the list 18 have a positive cash balance.

The transaction processor 30 may also utilize more sophisticated analysis techniques when selecting which payment source 20, 22 from the list 18 to use for a particular transaction. For example, because the improved payment system may be particularly useful for interactive services 10, shorter latency in approving transactions may be especially valuable. Thus, the transaction processor 30 may determine a predicted latency for each of the payment sources 20, 22 in the stored list 18 and may select a payment source 20, 22 from the list 18 with the lowest predicted latency. Where micropayments are involved, transaction costs may also be an important factor. Thus, the transaction processor 30 may determine a predicted transaction cost for each of the payment sources 20, 22 in the stored list 18 and may select a payment source 20, 22 from the list 18 with the lowest predicted transaction cost. Since the transaction processor 30 may assume a financial risk when approving certain transactions, it may also be desirable for the transaction processor 30 to determine a predicted fraud risk for each of the payment sources 20, 22 in the list 18 and may select a payment source 20, 22 from the list 18 with the lowest predicted fraud risk. Such determinations may be made for both the cash accounts 20 and the credit accounts 22 in the list 18 or they may only be performed for certain types of accounts (e.g., credit accounts 22).

In order to reduce transaction costs and speed up the approval process, it may also be desirable for the transaction processor 30 to accumulate transactions together for submission to the consumer's bank 32. For example, when the consumer 26 is engaged with an interactive service 10 and authorizes a micropayment while engaged with the service 10, it may be expected that the consumer 26 will also authorize additional micropayment transactions within a short period of time while engaged with the service 10. Thus, in this scenario it may be desirable for the transaction processor 30 to combine a plurality of micropayment transactions together and submit a single transaction payment request to the consumer's bank 32. This may be particularly useful when the payment source 20, 22 is a credit account 22 and the consumer's bank 32 is a credit account issuer 32 since these types of accounts usually have higher transaction costs for each transaction. Where the consumer 26 is engaged in a session of an interactive service 10 and the micropayment transactions are being submitted to a credit account issuer 32, it may be desirable for the transaction processor 30 to combine multiple transactions together and submit a single transaction payment request to the credit account issuer 32 for approval after the session is complete. This has the potential to significantly increase the speed of transaction approvals during an interactive session 10 since the more time-consuming credit account 22 approval process with the consumer's bank 32 only occurs after the session 10 is already complete.

It may also be desirable for the improved payment system to provide limits both for the consumer 26 and the transaction processor 30. For example, the consumer 26 may be allowed to set a stored budget limit for micropayment transactions. This may be useful since such transactions may occur during a session of an interactive service 10 and it may be difficult for the consumer 26 to keep track of every transaction authorized by the consumer 26. Thus, when previously approved micropayment transactions reach the stored budget limit, the transaction processor 30 may deny additional payment requests. The transaction processor 30 may also set a micropayment transaction limit. In this case, the transaction processor 30 may revert to conventional approval processes when payment requests exceed the micropayment transaction limit. When this happens, the transaction processor 30 may submit the payment request to the consumer's bank 32 (e.g., a credit account issuer 32) for approval before approving the payment request.

It is understood that the described improved payment system is intended to operate autonomously on programmed computer systems utilizing computer algorithms such that the system may be implemented by one or more computer processors (e.g., in a server system) executing computer-executable instructions stored on a non-transitory computer-readable storage medium. Thus, for example, in the case of the transaction processor 30 it is unnecessary for human beings to make the required determinations, submissions, approvals, etc. This autonomous design makes the improved payment system scalable to a level that would be impractical if human beings were to attempt to perform the steps required by the system. While it is understood that various human beings may provide inputs to the system and may adjust parameters that control how the system operates, the improved payment system is intended to have the capability of processing many thousands of transactions in short periods of time (e.g., seconds or less) that would be impossible to accomplish with human intervention in each transaction.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A system configured to process micropayment and non-micropayment transactions differently, the system comprising:

at least one computer-readable storage medium storing:

payment sources associated with a consumer for paying micropayment transactions, wherein the payment sources comprise at least one of a cash account or credit account associated with a corresponding account issuer; and financial information associated with the consumer; and a transaction processor configured to:

receive a micropayment transaction payment request from an interactive service in response to the consumer authorizing a micropayment transaction during interactive engagement with the interactive service;

in response to the micropayment transaction payment request, implement micropayment processing using the cash account or credit account, wherein the quick pay micropayment processing is different from non-micropayment processing using the cash account or credit account; and apply the micropayment processing to provide real-time approval of the micropayment transaction payment request using at least one of the cash account or credit account based on a real-time assessment of the financial information before receiving approval of the micropayment transaction payment request from the corresponding cash account or credit account issuer.

2. The system of claim 1, wherein the micropayment transaction payment request requests payment from the credit account.

3. The system of claim 1, wherein the consumer engages the interactive service during a session, the micropayment transactions and approval thereof occurring during the session.

4. The system of claim 1, wherein the micropayment transaction payment request is for less than $5.

5. The system of claim 1, wherein the interactive service is an electronic game and the micropayment transaction occurs during a session of the electronic game for an upgrade or continued play.

6. The system of claim 1, wherein the transaction processor is configured to select payment for the micropayment transaction based on an order of preference indicated by the consumer.

7. The system of claim 1, wherein the payment sources comprise a default source of payment, and wherein the default source of payment is associated with the cash account.

8. The system of claim 1, wherein the transaction processor is configured to select a payment source from the payment sources for the micropayment transaction payment request.

9. The system of claim 1, wherein the transaction processor is configured to select a payment source from the payment sources with a lowest predicted latency for the micropayment transaction payment request.

10. The system of claim 1, wherein the transaction processor is configured to select a payment source from the payment sources with a lowest predicted transaction cost for the micropayment transaction payment request.

11. The system of claim 1, wherein the transaction processor is configured to selects a payment source from the payment sources with a lowest predicted fraud risk for the micropayment transaction payment request.

12. The system of claim 1, wherein the transaction processor is configured to select a payment source from the payment sources associated with a cash account having a positive cash balance before selecting a payment source from the payment sources-associated with a corresponding credit account.

13. The system of claim 1, wherein the transaction processor is configured to select a payment source from the payment sources associated with a credit account when the payment sources are not associated with a cash account having a positive cash balance.

14. The system of claim 1, wherein the transaction processor is configured to verify an account balance of the cash account before approving the micropayment transaction payment request using the cash account.

15. The system of claim 1, wherein the transaction processor is configured to combine a plurality of micropayment transactions into a single transaction payment request submission to the corresponding cash account or credit account issuer for approval.

16. The system of claim 15, wherein the transaction processor is configured to submit the single transaction payment request to a corresponding credit account issuer for approval.

17. The system of claim 16, wherein the transaction processor is configured to submit the single transaction payment request to the corresponding credit account issuer for approval after the consumer completes a session of interactive engagement with the interactive service.

18. The system of claim 1, wherein the transaction processor is configured to deny the micropayment transaction payment request in response to a determination that previous micropayment transaction payment request approvals reached a budget limit set by the consumer for micropayment transactions.

19. The system of claim 1, wherein the transaction processor is configured to implement non-micropayment processing for the micropayment transaction payment request by submitting the micropayment transaction payment request to the corresponding credit account issuer for approval before approving the micropayment transaction payment request in response to a determination that the micropayment transaction payment request exceeds a micropayment transaction limit set by the transaction processor.

20. The system of claim 1, wherein the financial information associated with the consumer comprises an account status and financial transactions, if any, for each account associated with a payment source in the payment sources.

* * * * *